April 20, 1965 L. PÉRAS 3,179,197
COOLING SYSTEM OF REAR-ENGINED VEHICLES
Filed Dec. 27, 1961 2 Sheets-Sheet 1
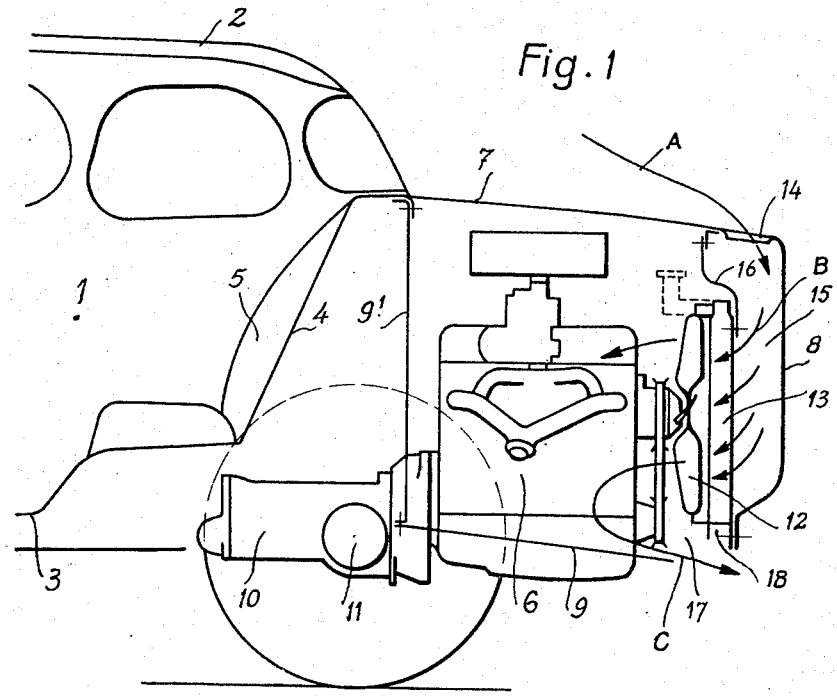
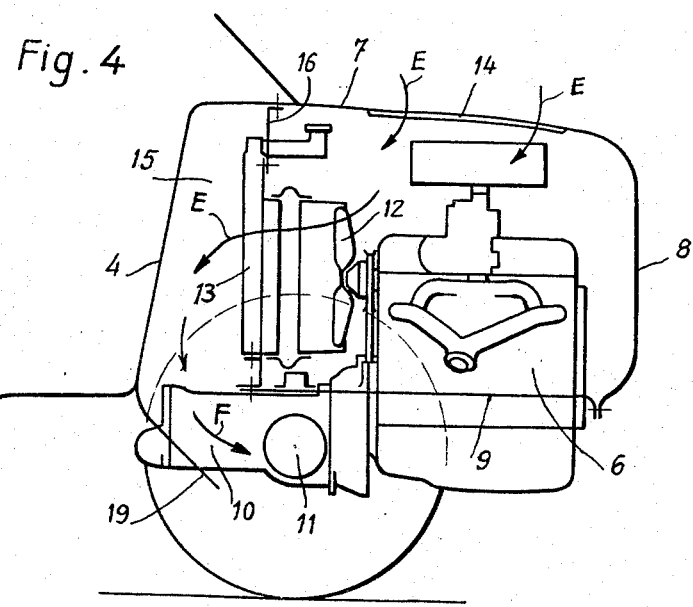
INVENTOR
Lucien Péras
By Stevens, Davis, Miller & Mosher
ATTORNEYS

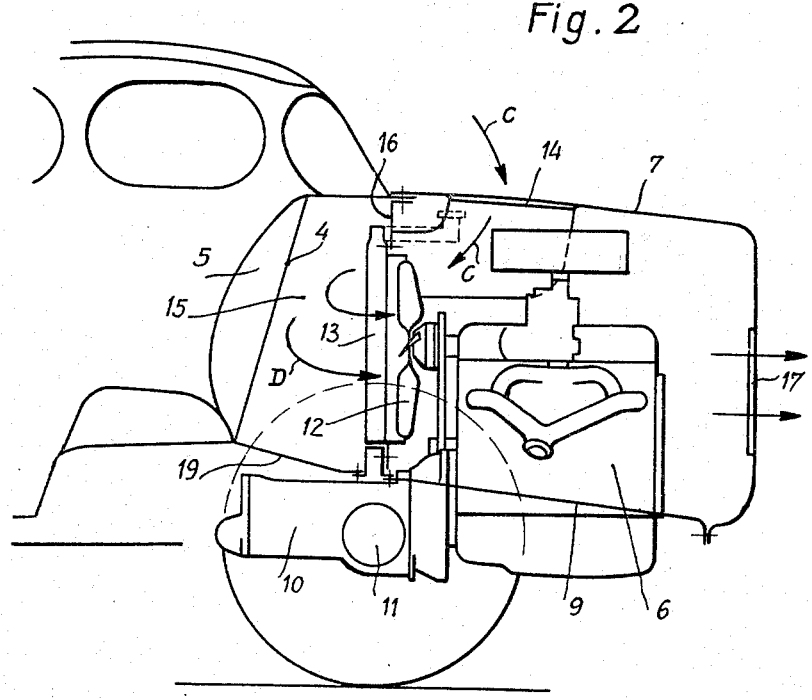
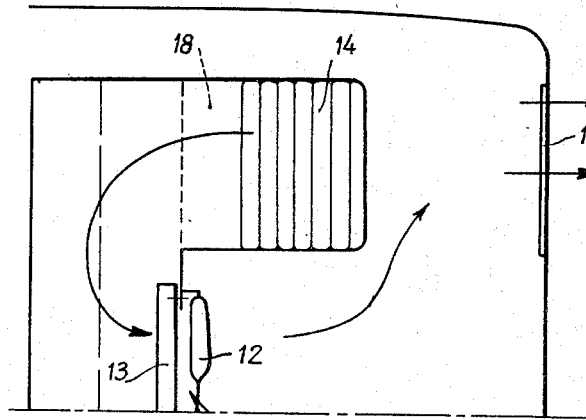

3,179,197
COOLING SYSTEM OF REAR-ENGINED VEHICLES
Lucien Péras, Billancourt, France, assignor to Regie Nationale des Usines Renault, Billancourt, France
Filed Dec. 27, 1961, Ser. No. 162,539
Claims priority, application France, Jan. 11, 1961, 849,389, Patent 1,285,365
1 Claim. (Cl. 180—54)

This invention relates in general to cooling systems for water-cooled engines of automotive vehicles and has specific reference to an arrangement of the cooling system component elements of an automotive vehicle, which comprise essentially a fan and a radiator as well as air inlet and outlet apertures for ensuring a sufficient flow of air in case the power unit is mounted at the rear of the vehicle. With this arrangement of the component elements of the cooling system it is possible to take advantage to a large extent of the dynamic air pressure caused by the motion of the vehicle, notably by properly disposing the cooling air inlet apertures.

Similarly, the outlet aperture is located with a view to utilise to the best advantage the dynamic suction system.

According to a specific arrangement forming the subject-matter of this invention, the air inlet is so disposed that the engine unit is efficiently protected against the ingress of rainwater as the latter in certain cases can enter the power unit compartment through the air inlet ports or louvres, notably by streaming therethrough when the vehicle is at a standstill. Moreover, the cooling air circuit is so arranged that any impurities contained in the incoming air stream are separated or filtered as a consequence of the dynamic filtering action resulting from a change of direction applied to the cooling air before it flows through the radiator. Finally, the air inlet ports are so located as to prevent the air stream polluted by the rolling of the wheels on the road surface from penetrating into the cooling circuit.

This invention will be described with reference to the attached drawings illustrating diagrammatically by way of example different embodiments of the cooling system of this invention. In the drawings:

FIGURE 1 is a diagrammatic view showing the rear portion of a passenger vehicle, wherein the rear-mounted engine is placed before the fan and radiator in the fore-and-aft direction;

FIGURE 2 is a similar view showing a different arrangement wherein the radiator precedes the fan and the engine;

FIGURE 3 is a fragmentary plan view of the arrangement of FIGURE 2, wherein the air inlet louvres are formed laterally of the bonnet, and FIGURE 4 is a view similar to FIG. 2 but showing an alternate arrangement.

Referring first to FIG. 1, the reference numeral 1 designates the passengers' compartment, 2 is the body top, 3 the floor and 4 a rear partition on which the rear squab 5 is secured. The rear-mounted engine 6 is housed in a compartment closed by a bonnet 7 and having fixed walls such as a rear panel 8, a floor 9 and a front partition 9¹.

A transmission comprising the gearbox 10 and differential 11 is mounted at the front end of the engine 6. The fan 12 driven in the conventional manner from the engine 6 is disposed at the rear, as shown.

The radiator 13 is mounted between the fan 12 and the rear panel 8. The aperture 14 through which cooling air is taken from the surrounding atmosphere is formed near the end of the engine bonnet 7. This aperture may consist of a plurality of rectangular slots, but any other shape may be resorted to without departing from the spirit and scope of the invention.

Thus, the cooling air induced through the inlet aperture 14 enters a chamber 15 formed on the one hand by the rear panel 8 and on the other hand by the radiator 13 and a plate or baffle 16 secured thereon.

This plate 16 seals the chamber 15 around the radiator 13 so that the air entering the chamber 15 can only flow through the radiator into the engine compartment as a consequence on the one hand of the dynamic pressure prevailing in this chamber 15 and on the other hand of the suction created by the fan 12 downstream of the radiator.

The plate or baffle 16 may consist either of a rigid sheet or panel, or of a flexible curtain, according as the radiator is mounted on the chassis frame or on the engine proper.

In the engine compartment an outlet aperture 17 for the cooling air is provided in the rear portion of the compartment between the floor 9 and a sheet 18 forming the lower extension of the radiator and of the lateral portions of plate 16.

It will be noted that the engine compartment is nearly weather-proof, except of course for the air inlet for the radiator and the outlet aperture 17 for the cooling air.

This cooling system operates as follows:

When the vehicle is still, the air penetrating through the aperture 14 is drawn through the radiator 13 by the fan 12 surrounded or not by a cowl. When the vehicle is in motion, the cooling air stream is induced into chamber 15 through the aperture 14 in the direction of the arrow A, FIG. 1, and then flows through the radiator, the plate or baffle 16 disposed around the radiator forcing the whole air stream through the radiator. It will be noted that the change of direction applied to the air stream in chamber 15 as shown by the arrows B will free the incoming air stream of coarse impurities likely to be present in the surrounding atmosphere from which this stream is taken, such as sand, leaves, grasshoppers, etc., thus preventing the radiator and engine from becoming soiled with various deposits, as these impurities will be discharged from chamber 15 through apertures provided at the bottom of this chamber.

The air having passed through the radiator it is blown by the fan onto and around the engine and then allowed to escape through the orifice 17 provided in the floor 9, as shown by the arrow C. The floor 9 and the front partition 9¹ surrounding the engine, as well as the side walls of the engine compartment, prevent any ingress of stray air likely to reduce the efficiency of the cooling air stream passing through the radiator. The outlet aperture 17 is located preferably in a zone where a certain vacuum or suction is produced as a consequence of the natural flow of air around the vehicle body when the latter is running.

FIGS. 2 and 3 illustrate an alternate embodiment of the improved cooling system of this invention, FIG. 2 being a diagrammatical section and FIG. 3 a half view from above.

In this modified embodiment the radiator and fan assembly is disposed between the rear squab partition 4 and the engine proper. The cooling air stream is induced through louvres 14 disposed somewhat laterally in the top bonnet element 7 and flows along two side ducts 18 disposed on either side of the engine. The air stream is thus directed into the chamber 15 defined by the rear squab partition 4, a bottom plate 19, the radiator 13 and a plate or baffle 16 surrounding the radiator, whereby the air stream is forced through the radiator along the path shown by the arrows C, D (FIG. 2). The air induced by the fan 12 through the radiator is subsequently blown onto and around the engine, and finally exhausted through orifices 17 disposed in the rear panel 8 of the vehicle.

In the other alternate embodiment illustrated in FIG. 4, although the disposal of the component elements is substantially similar to that illustrated in FIG. 2, the cooling air path differs somewhat in that the air stream penetrates through the louvres or slots 14 formed in the bonnet 7 into the engine compartment and is subsequently blown through the radiator 13 by the fan 12, in contradistinction with the two preceding embodiments wherein the cooling air stream is induced through the radiator by the fan. Thus the cooling air having passed through the radiator enters a chamber 15 closed by the rear squab partition 4 (or a similar partition), the radiator 13, a plate 16 sealing the chamber around the radiator and the bottom plate 19 acting as a baffle facilitating the escape of cooling air through the lower outlet aperture. Thus, the air stream follows the path shown by the arrows E, F from the inlet aperture to the outlet aperture.

Of course, various modifications and variations may be brought to the specific embodiments illustrated and described herein, without departing from the spirit and scope of the invention as set forth in the appended claims.

What is claimed is:

A cooling system for water cooled rear mounted engines of automobile vehicles comprising an engine compartment, an engine therein, a water cooling radiator disposed in front of the engine, a fan mounted between the engine and radiator, and air inlet means for passing cooling air through said radiator comprising a horizontal duct extending transversely of said compartment and in front of said radiator, and longitudinal ducts adjacent opposite sides of said horizontal duct and extending rearwardly on opposite sides of said engine, said longitudinal ducts having air inlet openings adjacent their rear upper ends, and air outlet means in the rear of said compartment behind said engine and in longitudinal alignment with said radiator.

References Cited by the Examiner
UNITED STATES PATENTS

| | | | |
|---|---|---|---|
| 1,979,191 | 10/34 | Burney | 180—54 |
| 2,033,731 | 3/36 | Nallinger | 180—54 |
| 2,353,266 | 7/44 | Reid | 180—54 X |
| 2,390,218 | 12/45 | Lamb et al. | 180—54 |
| 2,871,968 | 2/59 | Giacosa | 180—54 |

FOREIGN PATENTS

| | | |
|---|---|---|
| 695,729 | 8/40 | Germany. |
| 899,909 | 12/53 | Germany. |

PHILIP ARNOLD, *Primary Examiner.*

A. HARRY LEVY, *Examiner.*